Patented Aug. 17, 1937

2,089,970

UNITED STATES PATENT OFFICE 2,089,970

MERWINITE REFRACTORIES

Harley Clyde Lee, Columbus, Ohio, assignor to Non-Metallic Minerals, Inc., Cleveland, Ohio, a corporation of Ohio No Drawing. Application December 29, 1934, Serial No. 759,741

14 Claims. (Cl. 106—9)

This invention relates to refractories; and it is among the objects of the invention to provide new types of refractories, and make available products having utilities of considerable range. A further object is the application of materials which have heretofore not been considered as offering refractory possibilities.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In refractories heretofore customary, great care has been exercised in the selection of raw materials of relatively high grade, and insofar as lime has been concerned, it has been regarded more in the light of an evil to be maintained in the least possible amount, and compounds containing lime have been restricted to a relatively narrow range. I have now found however, that the mineral merwinite, which is a compound containing lime in quite high proportion, viz, $3CaO.MgO.2SiO_2$, has refractory properties of great value. Merwinite is found in nature in only two or three known localities, and in these cases it is admixed with other minerals, and very little data has been given as to its physical properties, and even less as to its thermochemical properties. I have found however, that the mineral merwinite can be easily formed from naturally-occurring raw materials, and this merwinite possesses notably useful properties as a refractory material; it has a higher melting temperature than fire clay refractories; it is resistant in refractory usage to basic open hearth slags; it has a lower heat conductivity than magnesite refractories; and it possesses slight hydraulic properties which permit it to be pressed readily into refractory shapes. Furthermore, mixtures of this compound with periclase can be readily made, and the merwinite serves as a desirable constituent, its slight hydraulic properties providing a low temperature bond, and the merwinite crystals forming a high temperature bond which contributes considerable spall-resistant properties to the refractory product. Such mixtures may be made by compounding suitable raw materials, or by mechanical mixtures of merwinite and periclase. While merwinite deposits are not generally available having sufficient purity, the utilization of merwinte mineral in the production of the new refractories would be possible; however, the synthetic preparation of merwinite composition refractories is readily possible with raw materials which are widely available. In general, in preparations in accordance with the present invention, lime, magnesia and silica are concerned, the weight ratio of the lime and silica being about 1.4 to 1, and the molecular ratio of the lime, silica and magnesia being as 3, 2, and at least 1, additional proportions of magnesia thereover being feasible, such additional magnesia in the finished product being then in the form of periclase which is compatible with the merwinite. As such raw materials, I may employ for instance, dolomite or magnesian lime-stones and silica, or magnesium silicates, such as serpentine, talc and olivine, also magnesites, as calcareous, silicious, or calcareous and silicious magnesites, and impure magnesites having heretofore been commercially impossible of utilization in preparation of refractories. By magnesian limestone is meant a stone which when calcined contains approximately 18 per cent or more of MgO, and for convenience dolomite and such magnesian lime-stones may be concisely referred to as magnesia-containing limestone. It is advantageous to employ raw material relatively free from or containing only small percentages of alumina or iron oxide. With the magnesia-containing limestone I incorporate silica in the form of sand or as magnesium silicate. The compounding of magnesia-containing limestone and silica or magnesium silicates is carried out along the lines of attainment of a composition presenting lime, silica and magnesia in the range of proportions above-noted. Similarly, in the case of silica-containing magnesites, the above-indicated composition is attained by the incorporation of limestone or dolomite in quantities to secure the approved ratio; and in the case of magnesites containing lime or both lime and silica, compensation toward the approved ratio may be made by the addition of silicious materials such as silica or magnesium silicates, or as required, addition of dolomite, magnesian limestone or limestone.

The raw materials are suitably pulverized and intimately mixed or ground to a slurry, and the slurry may be burned in a rotary kiln at suitable temperatures, for instance about 2800° F., or the slurry may be dried and be pressed into dobies, and these may be fired in a stack or periodic kiln. Merwinite can be formed easily at a comparatively low temperature (for example below 2500° F.). But to make satisfactory refractory shapes it is advantageous to mature the product by heating it to a higher temperature for a short period of time, as in a rotary kiln, or by prolonging the period of heating at a lower temperature, as in a periodic kiln. Small percentages of fluxing agents, as for example, iron oxide and alumina lower the temperature or time required for this maturing. Where the slurry is fired in a rotary kiln, a hard, dense, light brownish grey clinker results. In the case of dobies, the fired product is a dense, hard, light brown or brownish grey dobie. Such dobies or clinker may then be crushed in a suitable mill, for instance a dry pan, to pass a mesh of desired size, as 4 or 6, for example, and on tempering with a small amount of water, as 6 to 8 per cent, the mass may be pressed, conveniently in a dry press for instance, to form bricks, and these may be dried and fired at a suitable temperature, as 2500° F.- 2650° F.

As an example: Dolomite 400 parts by weight, and silica sand 83 parts by weight proportioned to give about 1.4 parts of lime for each part by weight of silica, are ground in a ball mill with water so that a substantial portion passes a 200 mesh screen. In slurry form, the material is fed to a rotary kiln and fired at a temperature of about 2800° F., to the formation of a dense, hard, light brownish grey clinker. The slurry if preferred can be partially dried and pressed into dobies which are fired in a periodic kiln to cone 16, or about 2650° F. for 48 hours, and the burned dobies or clinker may be crushed in a dry pan to pass a 6 mesh screen, and on being tempered with 6-8 per cent of water, the mass is pressed to bricks which are dried and fired at cone 14 to 16. The resulting product consists of crystals of merwinite intermixed with about 20 per cent of periclase. The product analyzes $SiO_2$ 28.4 per cent, $Fe_2O_3$ 0.8, $Al_2O_3$ 0.5, CaO 40.9, MgO 29.4.

As another example: About 200 parts of northern Ohio dolomite and 104 parts of Quebec serpentine, proportioned from their respective analyses to give about 1.4 parts of lime for each part by weight of silica in the mixture, are ground together. The resulting mixture is then fired in a rotary kiln at about 2900° F. to a dense, light brown clinker, or alternatively fired as dobies in a periodic kiln at a temperature of about 2750° F. for 48 hours. These dobies are dense, light brown in color, and consist essentially of merwinite and periclase, and show the following analysis: $SiO_2$ 22 per cent, $Fe_2O_3$ 4.5, $Al_2O_3$ 1.2, CaO 31, and MgO 41.2. The dobie product or clinker is then crushed in a dry pan to pass a 4 mesh screen, is tempered with about 6-8 per cent water, and pressed into refractory brick which are dried and fired at cone 14 to 16.

As a further example: About 100 parts of impure magnesite from southern Nevada (which analyzes 12.1 per cent $SiO_2$, 0.8 $Fe_2O_3$, 10 $Al_2O_3$, 6.8 CaO, and 35.2 MgO), and 34 parts by weight of dolomite (which analyzes 0.05 per cent $SiO_2$, 0.05 $Al_2O_3$ and $Fe_2O_3$, 30.4 CaO, and 21.9 MgO) are ground together. This mixture is formed into dobies and fired to about 2700° F. The resulting dobies are hard, dense, almost white in color, and show the following analysis: 16.5 per cent $SiO_2$, 1 $Fe_2O_3$, 1.3 $Al_2O_3$, 23 CaO, and 58 MgO. The crushed dobies may be used for monolithic linings for furnaces, or may be sized, tempered with water, and pressed into brick.

In the mineralization which occurs in firing compositions as above-indicated, lime and magnesia and silica react and combine, forming $3CaO.MgO.2SiO_2$ or merwinite, and if an excess of magnesia is present it provides periclase, as seen on petrographic examination. Such refractories thus not only afford the possibility of manufacture from materials not heretofore generally considered as coming within the purview of this art, but the products resulting are of great advantage in an important range of refractory usages.

Other modes of applying the principle of the invention may be employed, change being made as regards the details described, provided the features set forth in any of the following claims, or the equivalent of such, be employed.

I therefore particularly point out and distinctly claim as my invention:—

1. A refractory product comprising a plurality of refractory ingredients, a substantial one of whch is merwinite.

2. A refractory containing merwinite and periclase.

3. A refractory containing periclase and a bond of merwinite.

4. A refractory composition of merwinite, having lime, magnesia not less than 12 per cent, and silica, in which there is a weight ratio of lime and silica as 1.4 to 1.

5. A refractory composition of merwinite, having lime, magnesia and silica, in the molecular proportions of 3 mols of lime, 2 mols of silica, and at least 1 mol. of magnesia.

6. A refractory composition of merwinite having lime, silica and magnesia in molecular portions of 3, 2, 1, respectively, and additional magnesia over such proportions.

7. A process of making a refractory, which comprises heating at sinter-temperatures a mineral material containing lime, magnesia and silica in merwinite proportions.

8. A process of making a refractory, which comprises heating at sinter-temperatures a mineral material containing lime, magnesia and silica in merwinite proportions and additional magnesia aside therefrom.

9. A process of making a refractory, which comprises heating at sinter-temperatures lime, magnesia not less than 12 per cent, and silica in which there is a weight ratio of lime and silica as 1.4 to 1.

10. A process of making a refractory, which comprises heating at sinter-temperatures lime, silica and magnesia in which there are 3 mols of lime, 2 mols of silica, and at least 1 mol. of magnesia.

11. A process of making a refractory, which comprises heating at sinter-temperatures lime, silica and magnesia in which there are 3 mols of lime, 2 mols of silica, and at least 1 mol. of magnesia and additional magnesia over such proportion.

12. A process of making a refractory, which comprises heating at sinter-temperatures a magnesia-containing limestone and silica in which there is a weight ratio of lime and silica as 1.4 to 1 and magnesia to form merwinite.

13. A process of making a refractory, which comprises heating at sinter-temperatures a silica-containing magnesite and silicious material in which there is a weight ratio of lime and silica as 1.4 to 1 and magnesia to form merwinite.

14. A process of making a refractory, which comprises heating at sinter-temperatures a lime-containing magnesite and silica-containing magnesite and at least one of the additional components: lime, silica, in which there is a weight ratio of lime and silica as 1.4 to 1 and magnesia to form merwinite.

HARLEY CLYDE LEE.